United States Patent
Ely et al.

(10) Patent No.: US 12,511,832 B2
(45) Date of Patent: Dec. 30, 2025

(54) EXTRACTION OF 3D EVALUATION POINTS FOR IMAGE CONJUGATES

(71) Applicant: Raytheon Company, Waltham, MA (US)

(72) Inventors: Richard W. Ely, Lewisville, TX (US); Jody D. Verret, Rockwall, TX (US)

(73) Assignee: Raytheon Company, Arlington, VA (US)

( * ) Notice: Subject to any disclaimer, the term of this patent is extended or adjusted under 35 U.S.C. 154(b) by 101 days.

(21) Appl. No.: 18/455,416

(22) Filed: Aug. 24, 2023

(65) Prior Publication Data

US 2025/0069330 A1    Feb. 27, 2025

(51) Int. Cl.
*G06T 17/05* (2011.01)
*G06V 10/74* (2022.01)

(52) U.S. Cl.
CPC ............ *G06T 17/05* (2013.01); *G06V 10/761* (2022.01)

(58) Field of Classification Search
CPC .............................. G06T 17/05; G06V 10/761
See application file for complete search history.

(56) References Cited

U.S. PATENT DOCUMENTS

| | | | |
|---|---|---|---|
| 11,042,998 B2 | 6/2021 | Ely | |
| 11,127,145 B2 | 9/2021 | Ely | |
| 11,348,310 B2 | 5/2022 | Ely | |
| 11,538,135 B2 | 12/2022 | Ely et al. | |
| 11,568,638 B2 | 1/2023 | Sharp, III et al. | |
| 2011/0110557 A1* | 5/2011 | Clark | G01C 11/06 382/103 |
| 2016/0321838 A1* | 11/2016 | Barone | G06T 5/50 |
| 2021/0097280 A1* | 4/2021 | Sharp, III | G06T 7/60 |
| 2024/0054731 A1* | 2/2024 | Wolke | G06T 7/75 |
| 2024/0185595 A1* | 6/2024 | Wang | G06V 10/993 |

\* cited by examiner

*Primary Examiner* — Kee M Tung
*Assistant Examiner* — Xiaoming Wei
(74) *Attorney, Agent, or Firm* — Schwegman Lundberg & Woessner, P.A.

(57) ABSTRACT

Devices, systems, and methods for three-dimensional (3D) evaluation point (3DEP) identification; wherein a method can include receiving a first conjugate point of a first real two-dimensional (2D) image, receiving a second conjugate point of a second real 2D image, the first and second conjugate points corresponding to a same geographical location, determining a first set of points of a 3D point set that project to within a specified distance of the first conjugate point in the first real 2D image, determining a second set of points of the 3D point set that project to within the specified distance of the second conjugate point in the second real 2D image, identifying a common point in both the first set of points and the second set of points that satisfies a specified heuristic relative to all other points in both the first set of points and the second set of points, and using the point as the 3DEP.

11 Claims, 9 Drawing Sheets

EXTRACTION OF 3D EVALUATION POINTS FOR IMAGE CONJUGATES

TECHNICAL FIELD

Embodiments discussed herein regard devices, systems, and methods for identifying a three-dimensional evaluation point (3DEP) that corresponds to conjugate pixels in two-dimensional (2D) images.

DETAILED DESCRIPTION

Various embodiments described herein identify a best 3D point in a point cloud that corresponds to a set of user-identified image conjugate points. The current accepted workflow for performing a ground truth assessment for predicted error in a 3D data set requires manual selection of the corresponding point cloud location of the three-dimensional (3D) evaluation points (3DEP). Embodiments enable automated identification of the corresponding point cloud location of the 3DEPs. Embodiments allow for automated regression testing of true and predicted errors in point clouds. The true error is the delta between a multi-ray intersection of the image conjugates and the 3DEP location in the point cloud. The predicted error is the error covariance associated with the 3DEP in the point cloud. If the error propagation was performed correctly for determining the predicted error, the true error should agree with the predicted error.

Embodiments enable more efficient ground truth assessment of 3D predicted errors allowing more samples to be assessed over ground truth areas of interest (AOIs) with no additional manual effort.

Figure 1:
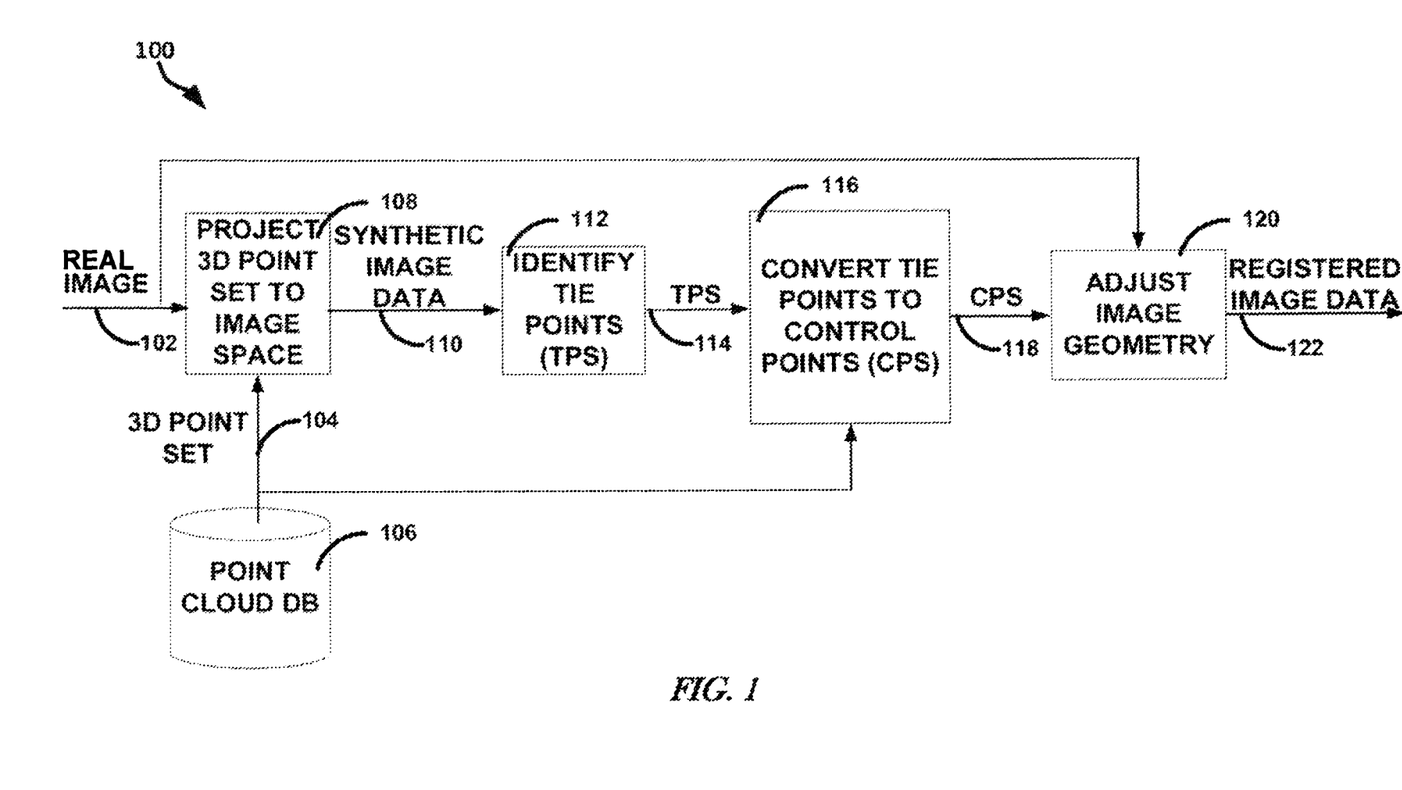
FIG. 1 illustrates, by way of example, a flow diagram of an embodiment of a method for 2D image registration to a 3D point set.

FIG. 1 illustrates, by way of example, a flow diagram of an embodiment of a method 100 for 2D real image registration to a 3D point set. The method 100 includes receiving real image 102 and a 3D point set 104. The real image 102 can be from a SAR, EO, panchromatic, IR, MSI, nighttime EO, visible, nighttime visible, or another image sensor. The image sensor may be satellite based, located on a manned or unmanned aerial vehicle, mounted on a moveable or fixed platform, or otherwise positioned in a suitable manner to capture the real image 102 of a region of interest. The 3D point set 104 can be from a point cloud database (DB) 106. The 3D point set 104 can be of a geographical region that overlaps with a geographical region depicted in the real image 102. In some embodiments, the 3D point set 104 can be of a geographical region that includes the entire geographical region depicted in the real image 102. In some embodiments, the 3D point set 104 can cover a larger geographical region than the geographical region depicted in the real image 102.

The image registration can occur in an overlap between the 3D point set 104 and the real image 102. The 3D point set data in the overlap (plus an uncertainty region) can be provided as input to operation 108. The overlap can be determined by identifying the minimum (min) and maximum (max) X and Y of the extent of the 3D point set 104 intersected with the min and max X and Y of the real image 102, where X and Y are the values on the axes of a geometric coordinate system of the real image 102.

The operation 108 can include establishing a scale of the synthetic image data 110 and its geographical extent. The scale can be computed as a point spacing of the 3D point set 104 or as a poorer of the point spacing of the 3D point set 104 and the X and Y scale of the real image 102. The geographical extent of the synthetic image data 110 can be determined by generating an X,Y convex hull of the 3D point set 104 and intersecting it with a polygon defined by X,Y coordinates of the extremes of the real image 102. The minimum bounding rectangle of this overlap region can define an output space for the synthetic image data 110.

At operation 108, the 3D point set 104 can be projected to an image space of the real image 102 to generate the synthetic image data 110. The image space of the real image 102 can be specified in metadata associated with image data of the real image 102. The image space can be the geometry of the real image 102, such as a look angle, focal length, orientation, the parameters of a perspective transform, the parameters and coefficients of a rational polynomial projection (e.g., XYZ-to-image and/or image-to-XYZ), or the like. The operation 108 can include altering a geometry of synthetic image data 110 that is derived from the 3D point set 104 to match the geometry of the real image 102. Since there is error in the geometry of the real image 102 and in changing the geometry of the synthetic image 110 derived from the 3D point set 104, the synthetic image data 110 may not be sufficiently registered to the real image 102 for some applications.

If more than one point from the 3D point set 104 projects to a same pixel of the synthetic image data 110, the intensity of a point from the 3D point set that is closest to the sensor position can be used. This assures that only points visible in the collection geometry of the real image 102 are used in the synthetic image data 110. Points that project outside the computed geographic overlap (plus some uncertainty region) can be discarded.

Each point in the 3D point set 104 can include an X, Y, Z coordinate, and color value (e.g., a grayscale intensity, red, green, blue intensity, or the like). In some embodiments a median of the intensities of the pixels that the point represents in all the images used to generate the 3D point set 104 can be used as the color value.

A geometry of an image can be determined based on a location, orientation, focal length of the camera, the parameters of a perspective transform, the parameters and coefficients of a rational polynomial projection (e.g., image-to-XYZ or XYZ-to-image projection or the like), and/or other metadata associated with the imaging operation in the real image 102.

At operation 112, tie points (TPS) 114 can be identified in the synthetic image data 110. A TP is a four-tuple (row from synthetic image data 110, column from synthetic image data 110, row of the real image 102, column of the real image 102) that indicates a row and column of the real image 102 (row, column) that maps to a corresponding row and column of the synthetic image data 110 (row, column).

The operation 112 can include operating an edge-based technique on an image tile to generate an edge pixel template for the synthetic image data 110 to be correlated with the gradient of real image 102. An edge pixel template can include a gradient magnitude and phase direction for each edge pixel in an image tile. The edge pixel template can include only high contrast edges (not in or adjacent to a void in the synthetic image data 110). Alternatives to edge-based correlation techniques include fast Fourier transform (FFT), or normalized cross correlation (NCC), among others.

In some embodiments, the operation 112 can include a two-step process, coarse registration followed by fine registration. The coarse registration can operate on a plurality image tiles (subsets of contiguous pixels of the synthetic image data 110). The plurality of image tiles can span the entirety of the real image 102. When the synthetic image data 110 is formed it may be misaligned with the real image 102 due, at least in part, to inaccuracy in the geometric metadata associated with the real image 102.

A registration search uncertainty can be set large enough to ensure that the synthetic image data 110 can be registered with the real image 102. The term coarse registration offset means a registration offset that grossly aligns the synthetic image data 110 with the real image 102. To make the registration efficient and robust an initial registration can determine the coarse registration offset and remove the same. The fine registration can then operate within a smaller uncertainty region. The coarse registration can employ a larger uncertainty search region to remove a misalignment error, or misregistration, between the synthetic image data 110 and the real image 102. Fine registration can use a smaller image tile size (and image template size) and a smaller search region to identify a set of TPS 114. The TPS 114 can be converted to CPs at operation 116. The fine registration can be performed after correcting alignment or registration using the coarse registration.

In both registration steps, a same or similar technique may be used to independently register each image tile. The fine registration can use a smaller tile size and a smaller search region. The operation 112 can include identifying pixels of the synthetic image data 110 corresponding to high contrast edge pixels. Identifying pixels of the synthetic image data 110 corresponding to high contrast edge pixels can include using a Sobel, Roberts, Prewitt, Laplacian, or other operator. The Sobel operator (sometimes called the Sobel-Feldman operator) is a discrete differentiation operator that computes an approximation of the gradient of an intensity image. The Sobel operator returns a gradient vector (or a norm thereof) that can be converted to a magnitude and a phase. The Roberts operator is a discrete differentiation operator that computes a sum of the squares of the differences between diagonally adjacent pixels. The Prewitt operator is similar to the Sobel operator. The operation 112 can include correlating phase and magnitude of the identified high contrast edge pixels, as a rigid group, with phase and magnitude of pixels of the real image 102.

To ensure that not all the edge pixels in the tile are running in the same direction (have gradients with same phase), the operation 112 can include computing two thresholds on the gradient magnitude, one for pixels whose gradient phase is near a principal phase direction and one for pixels not in the principal phase direction. The threshold for edges not in the principal phase direction can be lower than the threshold for edges in the principal phase direction. Edge correlation of the operation 112 can include summing over all the high contrast edge pixels of the gradient magnitude of the image times the gradient phase match between the synthetic image data 110 and the real image 102.

Edge pixels associated with voids in the synthetic image data 110 can be suppressed and not used in the correlation with the real image 102. The real image 102 has no voids so the gradients of all pixels of the real image 102 can be used.

One aspect of the method 100 is how the TPS 114 from coarse or fine registration are used to determine an offset for each tile between the synthetic image data 110 and the real image 102. A synthetic image edge pixel template can be correlated as a rigid group (without rotation or scaling, only translation) with a gradient magnitude and phase of the real image 102. A registration score at each possible translation offset can be determined. The registration scores can be determined as a weighted sum of the scores from each offset in each of the tiles. More details regarding the score are provided elsewhere.

While the method 100 is tolerant to blunders in the correlation of individual tiles, an offset from the coarse registration must be calculated correctly or there is a risk of not being able to perform fine registration. Since the fine registration can use a smaller search radius, an error in the offset may cause the correct correlation location to be outside the search radius of the fine registration, therefore causing fine registration to be unable to correlate correctly. The blunder metrics, offset checking, and further details of the operations 112, 116 are discussed elsewhere herein.

At operation 116, the TPS 114 are converted to CPS 118 using the 3D point set 104 from which the synthetic image data 110 was produced. The CPS 118 are five-tuples (row of the real image 102, column of the real image 102, X, Y, and Z) if the real image 102 is being registered to the 3D point set 104 (via the synthetic image data 110). The CPS 118 can include an elevation corresponding to a top of a building. A CP 118 corresponds to a point in a scene. The registration provides knowledge of the proper point in the 3D point set 104 by identifying the point that corresponds to the location to which the pixel of the synthetic image 110 is registered.

The TPS 114 can be associated with a corresponding closest point in the 3D point set 104 to become CPS 118. The TPS 114 can be associated with an error covariance matrix that estimates the accuracy of the registered TP 114. An index of each projected 3D point from the 3D point set 104 can be preserved when creating the synthetic image data 110 at operation 108. A nearest 3D point to the center of a tile associated with the TP 114 can be used as a coordinate for the CP 118. The error covariance can be derived from a shape of a registration score surface at a peak, one or more blunder metrics, or a combination thereof.

At operation 120, the geometry of the real image 102 can be adjusted (e.g., via a least squares bundle adjustment, or the like) to bring the real image 102 into geometric alignment with the synthetic image data 110. The photogrammetric geometric bundle adjustment can include a nonlinear, least squares adjustment to reduce (e.g., minimize) misalignment between the CPs 118 of the real image 102 and the synthetic image data 110.

This adjusted geometry could be used for the synthetic image data 110 as well, except the synthetic image data 110 may be of poorer resolution than the real image 102 and may not be at the same absolute starting row and column as the real image 102. The adjusted geometry of the real image 102 can be used to create a projection for the synthetic image data 110 that is consistent with the absolute offset and scale of the synthetic image data 110.

After the operation 120 converges, the geometry of the real image 102 can be updated to match the registered control (the 3D point set). As long as the errors of the TPS 114 are uncorrelated, the adjusted geometry is more accurate than the TPS 114 themselves. A registration technique using CPS (e.g., a known XYZ location and a known image location for that location) can be used to perform operation 120. From the CPS 118, the imaging geometry of the real image 102 can be updated to match the geometry of the CPS 118.

Adjusting the geometry of the real image 102 (the operation 120) is now summarized. Image metadata can include an estimate of the sensor location and orientation at the time the image was collected, along with camera parameters, such as focal length. If the metadata was perfectly consistent with the 3D point set 104, then every 3D point would project exactly to the correct spot in the real image 102. For example, the base of a flagpole in the 3D point set 104 would project exactly to where one sees the base of the flagpole in the real image 102. But, in reality, there are inaccuracies in the metadata of the real image 102. If the estimate of the camera position is off a little, or if the estimated camera orientation is not quite right, then the 3D point representing the base of the flagpole will not project exactly to the pixel of the base in the real image 102. But with the adjusted geometry, the base of the flagpole will project very closely to where the base is in the real image 102. The result of the registration is adjusted geometry for the real image 102. Any registration process can be used that results in an adjusted geometry for the real image 102 being consistent with the 3D point set 104.

Figure 2:
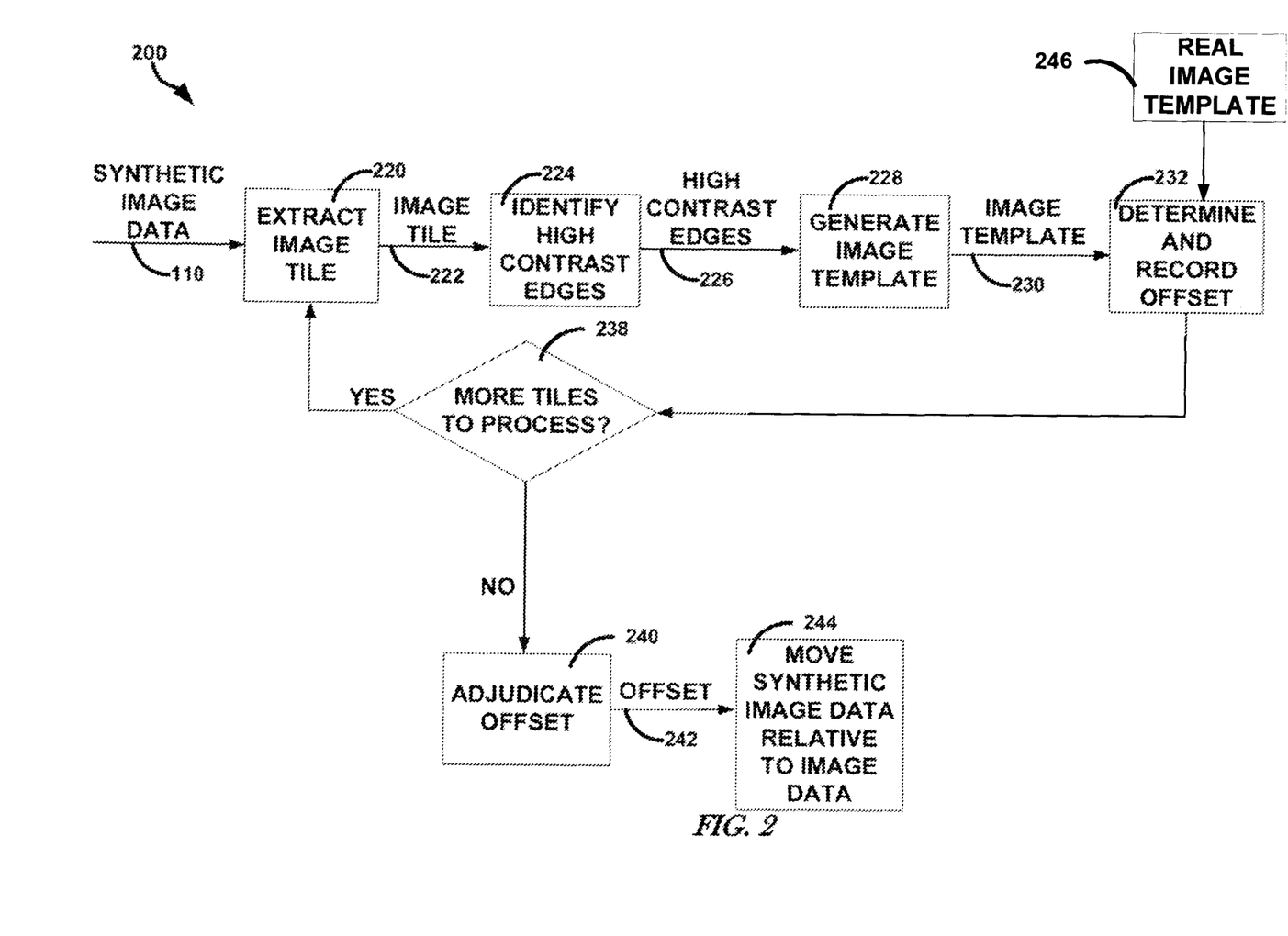
FIG. 2 illustrates, by way of example, a diagram of an embodiment of a method for registering the synthetic image data to the real image.

FIG. 2 illustrates, by way of example, a diagram of an embodiment of a method 200 for registering the synthetic image data 110 to the real image 102 (e.g., performing the operation 120). At operation 220, an image tile 222 is extracted from the synthetic image data 110. The image tile 222 is a proper contiguous subset (less than the whole) of the synthetic image data 110 that is a specified number of rows of pixels by a specified number of columns of pixels. The number of rows and columns can be a same or different number. A plurality of the image tiles 222 can combine to span an entirety of the 2D real image 102. The image tiles 222 may or may not overlap. Each of the image tiles 222 is processed to determine a correlation score at a plurality of potential offsets (number of pixels in column and row directions to move the image tiles 222).

At operation 224, high contrast edges 226 of the image tile 222 are identified. The operation 224 can include using a gradient magnitude histogram and a phase histogram. A desired percentage set to a first threshold (e.g., 9%, 10%, 11%, 12%, 15%, a larger or smaller percentage, or some other percentage therebetween) for template sizes less than a specified size (e.g., 16,384 pixels (e.g., 128×128 pixels, or other number of pixels) and smaller) and a second, smaller threshold for larger templates sizes (e.g., 4%, 5%, 6%, a larger or smaller percentage, or some other percentage therebetween). It can be beneficial to use high contrast edge pixels whose edge directions (phases) are not all similar to each other. If the high contrast edges pixels had the same phase, there would be reliable registrability in the direction perpendicular to the edge direction, but not along the edge. So the first step in determining which edge pixels to use in the template can include histogramming the gradient phase over all the pixels in the template image (e.g., using the gradient magnitude as the weight for each pixel when adding it to the histogram bin). Using a two-pane window each a specified number of degrees (e.g., 5, 10, 15, or other number of degrees) wide and 180 degrees apart, a sum over the histogram can be performed to find the highest window sum. The center of the pane with the highest sum can be set to be the principal phase direction. The pixels can be split into two sets, those whose phases are within +/−45 degrees (modulo 180) of the principal phase direction and those that are not. An interval larger or smaller than +/−45 degrees can be used. A different gradient magnitude threshold can be set for each set.

It can be desired to provide about half of the total high contrast edge pixels from each of the two sets. To do this for a particular set, the gradient magnitude over all the pixels in that set can be histogrammed. The gradient magnitude threshold can be identified at which a percentage of the total of high contrast edge pixels is realized. After the two thresholds are established, all the pixels from each set that are below the threshold are removed from the template. There are at least two reasons that edge based registration provides better results than FFT or NCC. First, the synthetic image data 110 usually has a significant number of voids due to voids in the 3D point set 104. These voids are not handled effectively by FFT and NCC correlation, even when a hole-filling algorithm is performed. The second reason is the ability to register to multiple sensor types using edge-based TP identification. The sensor types can include daytime panchromatic and MSI, IR, SAR, nighttime EO, or the like. The FFT and NCC correlation methods are not effective when the synthetic image intensities are from a different sensor modality than that of the image being registered. In contrast, an edge-based correlation method is effective across sensor modalities.

At operation 228, an image template 230 can be generated. The image template 230 is the same size as the image tile and includes only those pixels corresponding to the identified high contrast edges at operation 224.

At operation 232, an offset and correlation between the real image 102 and the tile 230 at each offset can be recorded. The operation 232 generates a sort of array of correlation scores for the image template 230. The array of correlation scores indicates the correlation of the image at a given offset from an initial location estimate of the image template 230 in the real image 102. The initial location estimate can be determined based on the projection of the 3D point set 104 to the real image 102 in the generation of the synthetic image data 110. The X and Y of the 3D point set 104 can be adjusted based on the geometry of the real image 102 to generate the location estimate.

For each pixel in the image template 230 there are at least three values: 1) its row value in the template; 2) its column value in the template; and 3) its gradient phase. As previously discussed, there is an initial estimate of where this template is in relation to the real image 102 to which the real image 102 is being registered. The search range is of delta row offsets and delta column offsets that the image template 230 is rigidly moved around in and compared to the gradient magnitude and phase of the real image 102. At each offset, the template pixels will fall on a particular set of pixels in the real image 102 to which the tile 222 is being registered.

At operation 240, it a list of quality offsets can be determined. Several metrics may be used to assess the quality of each candidate offset. The metrics can consider multiple peaks from a combined score array. This can be controlled by two parameters (which are user controllable). The first parameter is the minimum ratio of candidate peaks to the top peak. For example, if this parameter is set at 0.85 then only peaks whose combined score is at least 85% of the top peak are considered. The remaining offsets are not considered. The second parameter is the minimum separation between peaks. For example, if the minimum separation is set at 7 pixels, then any peak that is closer than 7 pixels to a higher scoring peak is eliminated as being a potential second highest peak.

If the identified offset passes the test at operation 240, the offset can be added to a set of potential offsets. If the offset does not pass the test, the offset can be discarded at operation 236. This means that the offset is not used in registering the synthetic image data 110 to the real image 102. At operation 238, it can be determined if there are more tiles to process. The operation 220 can then be performed to get a next image tile 222 if there are more tiles to process. Otherwise, operation 240 can be performed.

The operation 240 can adjudicate between estimates of the correct offset. Note that for each image tile, an offset score is determined at each location in the search region, so the operation 240 attempts to determine which offset is the most correct.

To identify peak correlation values at operation 240, a highest value in the combined correlation array can be identified. A score threshold that the candidates have to meet can be determined based on the identified highest value. Then, all candidates that meet or exceed the score threshold in the combined correlation array can be identified. However, the candidate not only has to meet the threshold, but it also has to be a peak. To decide if is a peak it must be a local maximum in a specified-pixel radius (e.g., a 1-pixel, 2-pixel, or larger radius). The actual test for local maximum in the 1-pixel neighborhood is to apply a strict test for upper left, i.e. entire row above the center point in consideration and the pixel left of center, and then a greater than or equal test for the point to the right of center and the entire bottom row. This ensures a local maximum is provided even if two or more adjacent pixels have the same value. When a pixel meets or exceeds the threshold and the local maximum test, then it is added to an array so that afterward a minimum separation test can be applied. The combined correlation array has an offset and correlation score for each of the pixels, including the local maxima.

Prior to the separation test, the local maxima can be sorted based on the correlation scores, providing an ordered list where earlier values in the list have higher scores than values later in the list. (Of course, in our sorted list some entries could have the same score). The list can then be pruned and one or more of the points can be marked for elimination if they fail a separation test. For any point in the list, all the points above it (that were not marked for elimination) and if any point is within the separation distance of a "kept" higher scoring point it is marked for elimination. After the entire list is processed one can eliminate all the points that were marked for elimination. For each location in a search region that passes the metrics, two or more of the following score parameters can be recorded:

(1) An offset in terms of number of pixels in the row direction and column direction the image tile was moved from the initial location
(2) A combined coarse registration score ratio of the combined correlation score at the current location to the combined highest correlation score
(3) Number of tie points at the current candidate offset
(4) A ratio of a second highest correlation score to the highest correlation score averaged over all registered tiles
(5) A phase match value. The phase match value can be the average phase match of the correlation edges between the gradient of the image tile 222 and the gradient of the real image 102 (measured at the registration offset associated with the top peak) over all registered tiles
(6) An affine residual value that is the average affine fit residual over all the tie points generated for the current offset
(7) An overall score that is a combination of two or more of (1)-(6).

Figure 3:
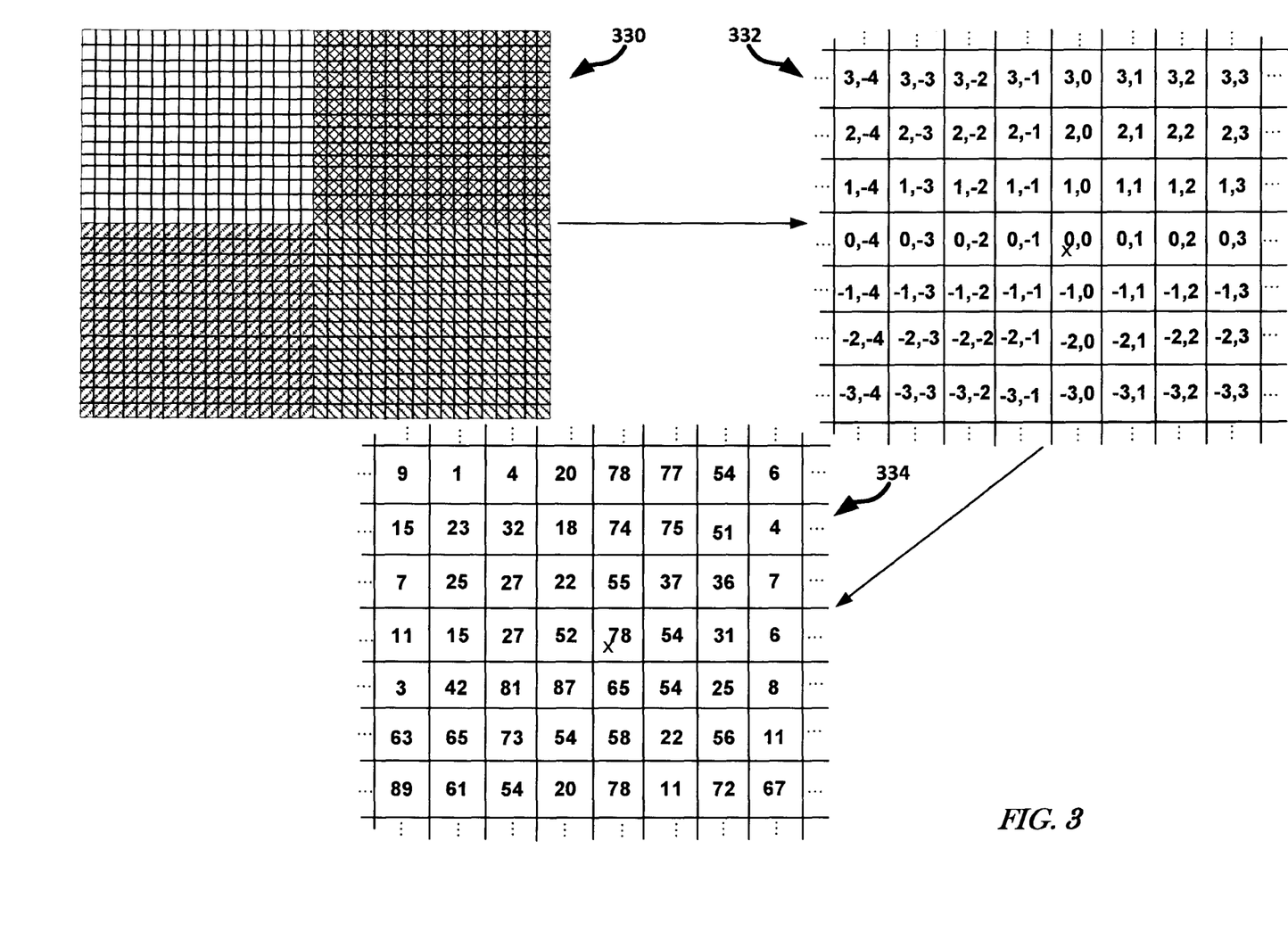
FIG. 3 illustrates, by way of example, a flow diagram to help explain the coarse registration. In coarse registration, the synthetic image is split into overlapping or non-overlapping image tiles.

FIG. 3 illustrates, by way of example, a flow diagram to help explain the coarse registration. In coarse registration, the synthetic image is split into overlapping or non-overlapping image tiles. An example image tile split is shown at 330. A correlation score at each location in a search region is determined. The search region 332 is shown.

The correlation score arrays for each of the image tiles of the image can be weighted and then summed entry by entry. That is, all weighted correlation scores at the expected offset can be summed to generate a combined score for the expected offset; all scores at the offset (0,1) of all image tiles are summed to generate a combined score for the offset of (0,1); all scores at the offset (0,2) of all image tiles are summed to generate a combined score for the offset of (0,2); and so on to generate combined scores at each offset in the search region 332.

A combined correlation score array 334 is also shown. Each correlation score in the combined correlation score array 334 corresponds to an offset from an expected location. The expected location is indicated by "x" in FIG. 3 and is the center of the search region 332 in this example. The correlation score "89" in the combined correlation score array 334 corresponds to the highest combined correlation score and corresponds to an offset of (−3, −4). That is, the highest combined correlation score generated by the correlation metric for this image tile corresponds to moving the image tile four columns of pixels to the left and three rows of pixels downward relative to the real image 102 and the expected location.

The weight applied to the correlation scores from each tile can be based on (i) a ratio of the top two correlation scores in the tile and (ii) the average phase match between the correlation edges of the image tile gradient and the gradient of the real image 102 at the offset associated with the highest correlation score in the image tile. The weight can be a minimum of one. The weight can be higher for average phase matches that are higher and ratios that are lower. If the phase match is higher and the ratio is lower, there is more confidence that the corresponding offset at that location is the correct offset. An example weight equation is provided, but other weight equations are possible:

$$\text{Weight} = \text{Max}(1, 10 * (1 - pkratio) * (avgphasematch - 48))$$

Where pkratio is the ratio of the second highest peak correlation score to the highest peak correlation score and the avgphasematch is the average phase match described. The pkratio eliminates a region around the top score and looks for the second best score outside of the eliminated region.

Assume, for explanation purposes, that the user indicated that the ratio of the candidate peak must be at least 85% of the top combined correlation score. The ratios of the peaks for each of the combined correlation scores over 75 are {100, 98, 91, 88, 88, 88, 87, 84}. Any peaks with score of 75 or less, can thus be removed as a candidate peak because, in this example, the candidate peak is only 84% of the top peak (i.e. 75/89=0.84) so this peak is removed from further consideration as the candidate offset.

The operation 240 can operate further on the combined correlation score array 334 to identify potential offsets. The highest combined correlation score values are identified. In the example of FIG. 3, the highest combined correlation scores that are "76" or higher are, from highest to lowest, {89, 87, 81, 78, 78, 78, 77}. These highest combined correlation scores correspond to the following respective offsets {(−3,−4),(−1,−1),(−1,−2),(3,0),(0,0),(−3,0),(3,1)}.

Not all of these highest correlation scores correspond to correlation score peaks. To be a peak, the correlation score must be a highest correlation score in a neighborhood of pixel correlation scores. A neighborhood can be a 3×3 rectangle with the potential peak at center pixel, or other size neighborhood, for example. Assuming a peak is the largest highest correlation score in a 3×3 neighborhood that is greater than a minimum value, the offsets that are retained are {89, 87, 78,78} at {(−3,−4),(−1,−1),(3,0),(−3,0)}, respectively.

Next, any candidate peaks within a specified pixel distance of another, higher peak, are removed from the list. Assume, for this example, that any peaks within a 5×5 neighborhood of a candidate peak (with the candidate peak at center) and lower in the list, are removed. In this example, the score of "78" at (−3,0) is removed because it is within the 5×5 neighborhood of "87" which is a higher peak. This leaves candidate peaks of {89, 87, 78} at respective offsets {(−3,−4),(−1,−1),(3,0)}. Note, the score parameter (7) above is used to determine which peak is deemed the actual offset.

After the list of candidate peaks has been determined, then fine registration for each candidate offset is performed at the candidate's coarse offset. In fine registration, the row and columns offsets are determined by subtracting the row and column position in the combined score array from the center row and column of the array. The fine registration also tiles the synthetic image but usually with a smaller tile size than is used in coarse registration. Also, in fine registration, a smaller search radius for a more accurate offset is used. For the candidate offset, tie points that pass fine registration blunder metrics are identified.

An affine transformation between the real image 102 and the synthetic image data 110 can be identified or determined, such as based on the TPS 114 and the offset determined by the adjudicated offset. The affine transformation can be determined using a least squares fit to the TPS 114 between the real image 102 and the synthetic image data 110 at the determined offset. The result of the affine transformation indicates the pixel in the other image corresponding to a given pixel in a source image.

An affine transformation is a linear mapping that preserves points, straight lines, planes. That is, parallel lines in a source image remain parallel after an affine transformation to a destination image. Different affine transformations include translation, scale, shear, and rotation.

An affine transformation is fit to the set of "good" tie points [if at least four good tie points are found]. The average affine fit residual is computed. Then a total quality score for the offset can be computed based on two or more of the score parameters. An example equation for the score is:

$$\text{Score} = scoreRatio \times numberOfTiePoints \times AvgPhzmatch/(AvPkratio \times AvgAffineFitResidual)$$

where scoreRatio is the combined score value of the peak divided by the top combined score
numberOfTiePoints is the number of tie points that passed the blunder metrics
AvgPhzmatch is the average of the phase match blunder metric over all the good tie points
AvgPkratio is the average of the pkratio blunder metric over all the good tie points
AvgAffineFitResidual is the average of the affine fit residuals over all the good tier points The correct coarse registration offset is taken to be the one with the largest total quality score. Fine registration can then be performed, which results in ground control points (GCPs) derived from the tie points that pass the blunder thresholds.

The method 200 can be performed one, two, or more times. In some embodiments, each consecutive performance of the method 200 can use a smaller image tile 222 (and corresponding search radius) that is smaller than in an immediately prior performance of the method 200.

Consider the following table of potential offsets and the corresponding score parameters (for an example distinct from the example provided in FIG. 3):

TABLE 1

Example score parameters and total score

| Cand. | Offset | pkratio | Tie Pts | Pkratio | Phasematch | Aff. Resid. | score |
|---|---|---|---|---|---|---|---|
| 1 | −56, 2 | 1 | 19 | 0.888 | 58.7 | 46.35 | 27.1 |
| 2 | −47, 46 | 0.926 | 23 | 0.889 | 58.89 | 32.78 | 43.08 |
| 3 | −9, 47 | 0.903 | 20 | 0.872 | 59.8 | 24.01 | 51.61 |
| 4 | −24, 0 | 0.861 | 19 | 0.879 | 56.33 | 35.36 | 30.43 |

Assuming the score parameters of Table 1, the candidate 3 at offset (−9, 47) would be chosen as the offset to be used for coarse registration because it received the highest score of 51.61.

As previously mentioned, after coarse registration results (a first pass of the method 200) are applied, a fine registration can be performed using a smaller search region. The same registration method 200 (including blunder metrics) can be applied. The TPS 114 that pass the blunder metrics can be converted to CPS 118 using the closest projected 3D point to the center of the tile. Each point in the 3D point set 104 has an intensity associated with the point. When a point (via the geometry of the real image 102 we are registering to) of the 3D point set 104 is projected to a pixel in the synthetic image data 110, that point will, very likely, not project exactly to the center of a pixel. Whatever pixel of the synthetic image data 110 it projects to is associated with an intensity associated with the point. The synthetic image data 110 can retain a point identification of the point whose intensity was used to fill in the pixel. Because the 3D point set 104 may be irregularly spaced and have voids not every pixel may get filled in. Each empty pixel of the synthetic image data 110 can be provided with an intensity derived from the neighbors that are filled. If the pixel has no nearby neighbors that are filled in (which can happen for large voids in the point set), that pixel can be left empty and not used in the registration. When registering an edge template to the real image 102, a center of the template is a convenient location from which to get a CP, but the center pixel may have been a pixel that did not have a 3D point that projected to it. In such cases, a pixel closest to the center that did have a point projected to it can be used for the CP. The X, Y, and Z of that point can be used as a location of the CP. The image location of CP can be shifted to be commensurate with the pixel being used in the CP. The image location can be further moved (in a subpixel fashion) to account for where inside the pixel the point actually projected. For example, the 3D point may have projected to a point a seventh of a pixel row above the center of the pixel and a quarter of a pixel column to the right of the center of the pixel. The image location can be shifted with these subpixel row and column adjustments to correspond to actual projected point.

Figure 4:
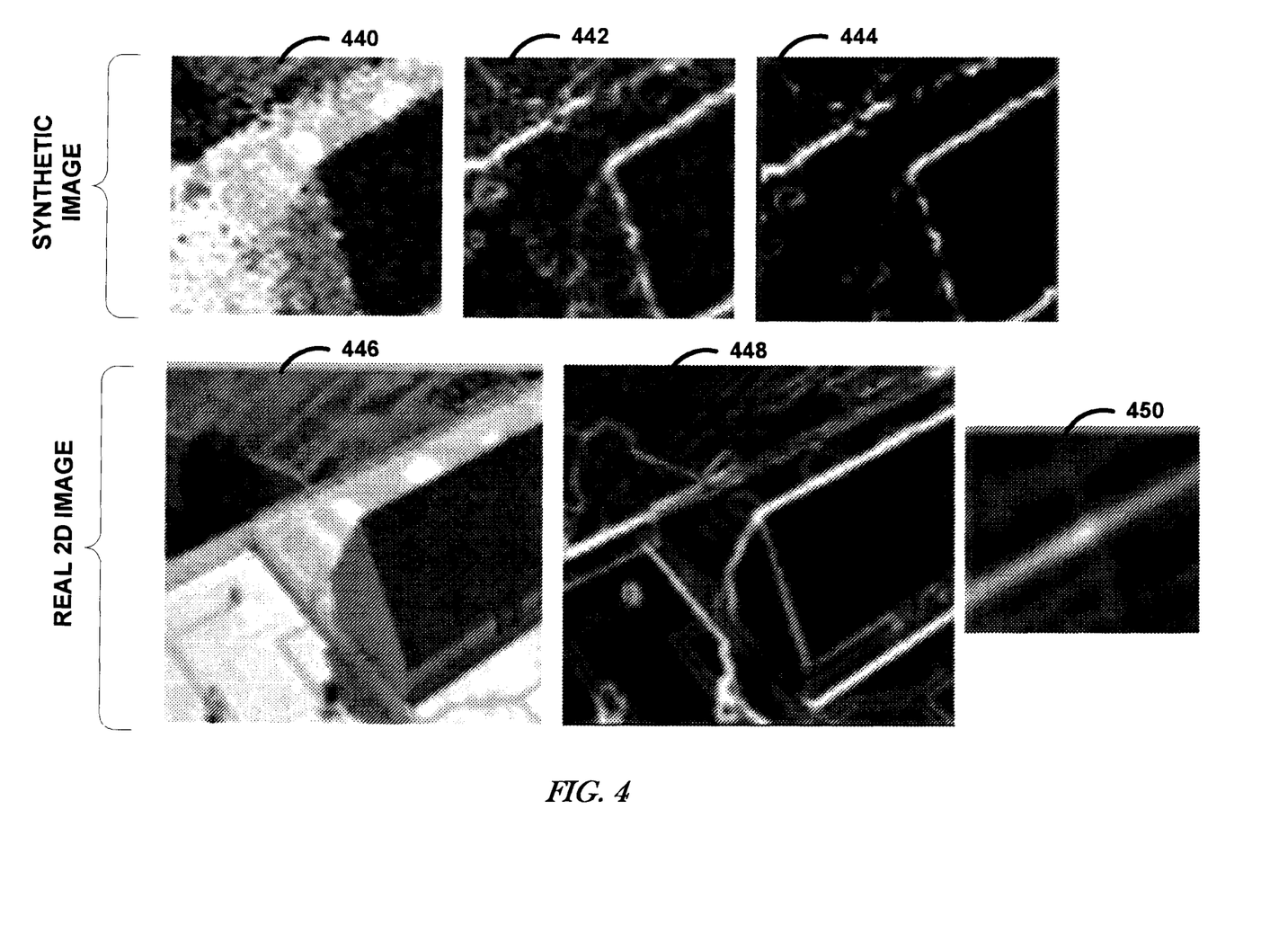
FIG. 4 illustrates, by way of example, grayscale image chips of an edge-based registration of an image tile.

FIG. 4 illustrates, by way of example, grayscale image chips of an edge-based registration of an image tile. The image chips include views of a point cloud and image. The upper row of image chips shows the tile from a synthetic image tile 440, a gradient magnitude from a Sobel operator in image chip 442, and high contrast edge pixels selected to use in the registration in image template 444. The Sobel gradient operator can be used to generate gradient magnitude and phase for both the synthetic image tile 440 and a corresponding image tile 446. The image tile 446 includes a proper subset of the pixels of the real image 102. The lower row of images in FIG. 4 shows the image tile 446 to which to register, its Sobel gradient magnitude in image chip 448, and a registration score resulting from correlating the high contrast synthetic image edges with the gradient from the image being registered at image chip 450. The image tile 446 is larger than the synthetic image tile 440 because it must accommodate the template size of the synthetic image tile 440 plus the registration search radius (to account for error). The correlation score in image chip 450 (at each offset) indicates that the highest correlation of the high contrast edges occurs with the center point of the synthetic image tile 440 projected to a pixel below center and right of center in the image tile 446. The process of FIG. 4 can be repeated using a tile of a smaller size and a smaller search region to get an even better correlation of the high contrast edges.

Figure 5:
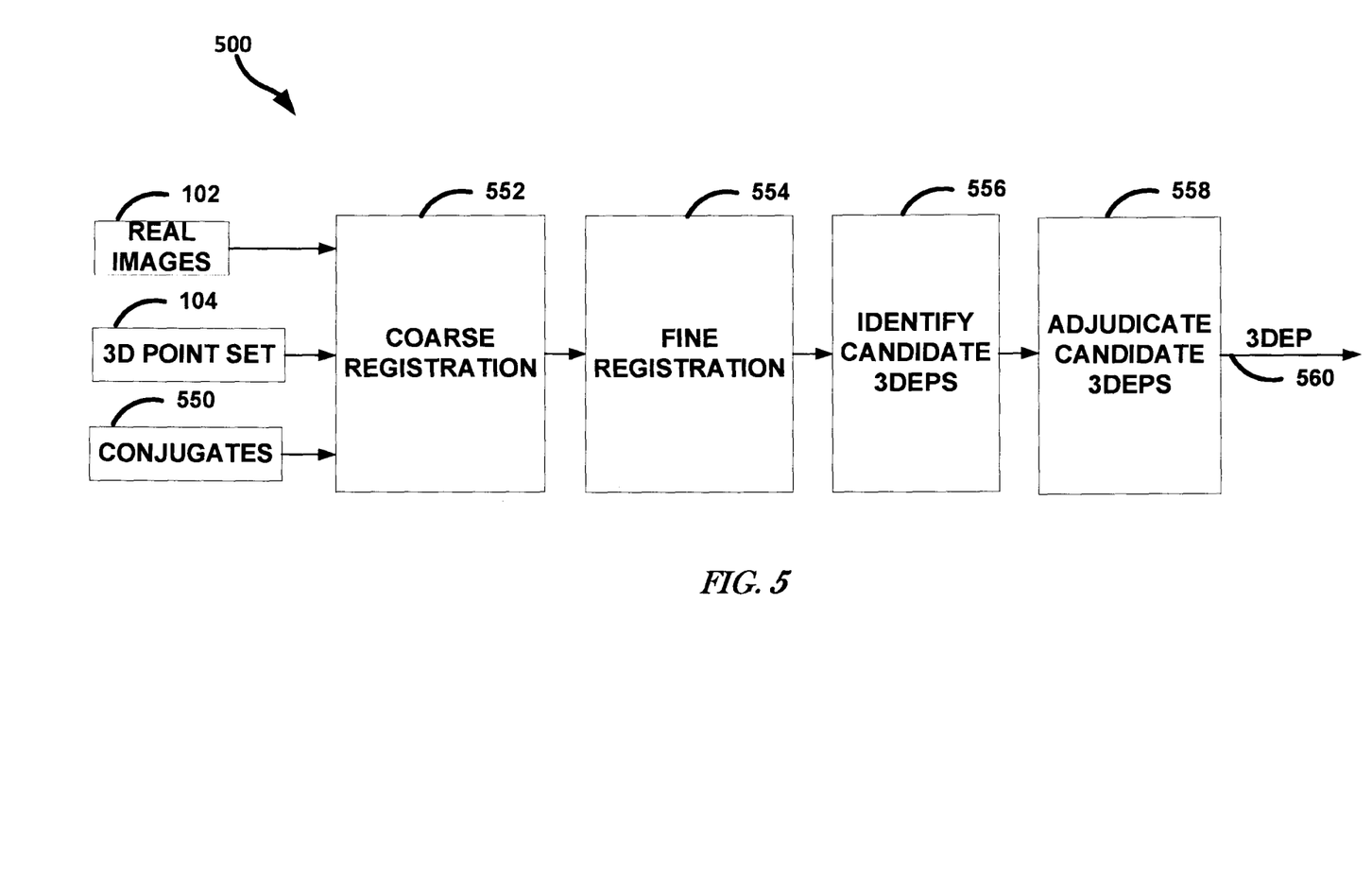
FIG. 5 illustrates, by way of example, a diagram of an embodiment of a method for generating 3D evaluation points (3DEPs) based on real images, a 3D point set, and image conjugates.

FIG. 5 illustrates, by way of example, a diagram of an embodiment of a method 500 for generating 3DEPs 560 based on images 102, a 3D point set 104, and image conjugates 550. The real images 102 and the 3D point set 104 illustrate a same geographical region. The conjugates 550 can be user-identified points (one point from each of the real images 102) in each of the real images 102 that correspond to the same geographical point. The conjugates 550 can be automatically identified respective points in each of the real images 102 that correspond to the same geographical point. Automatic identifying conjugates can be performed by an automated tie point extraction process, for example. The method 500 as illustrated includes coarse registration 552, fine registration 554, identifying candidate 3DEPSs at operation 556, and adjudicating the candidate 3DEPs at operation 558. The coarse registration 552 and the fine registration 554 are discussed regarding the adjudicate offset operation 240 of FIG. 2. In general, coarse registration identifies an offset to move the synthetic image data 110 relative to the real image 102 to better align features in both the 3D point set 104 and the real images 102. The coarse registration 552 determines the offset by identifying correlation peaks and determining a score for each of the identified correlation peaks. The correlation peak with the highest score is adjudicated as the actual offset. Fine registration 554 operates on the synthetic image data 110 at the offset and determines a finer offset (sub-pixel offset) typically using a smaller search radius and smaller image tile than what is used in the coarse registration 552. The fine registration 554 aligns the synthetic image data 110 and the real image 102 at a sub-pixel level.

Figure 6:
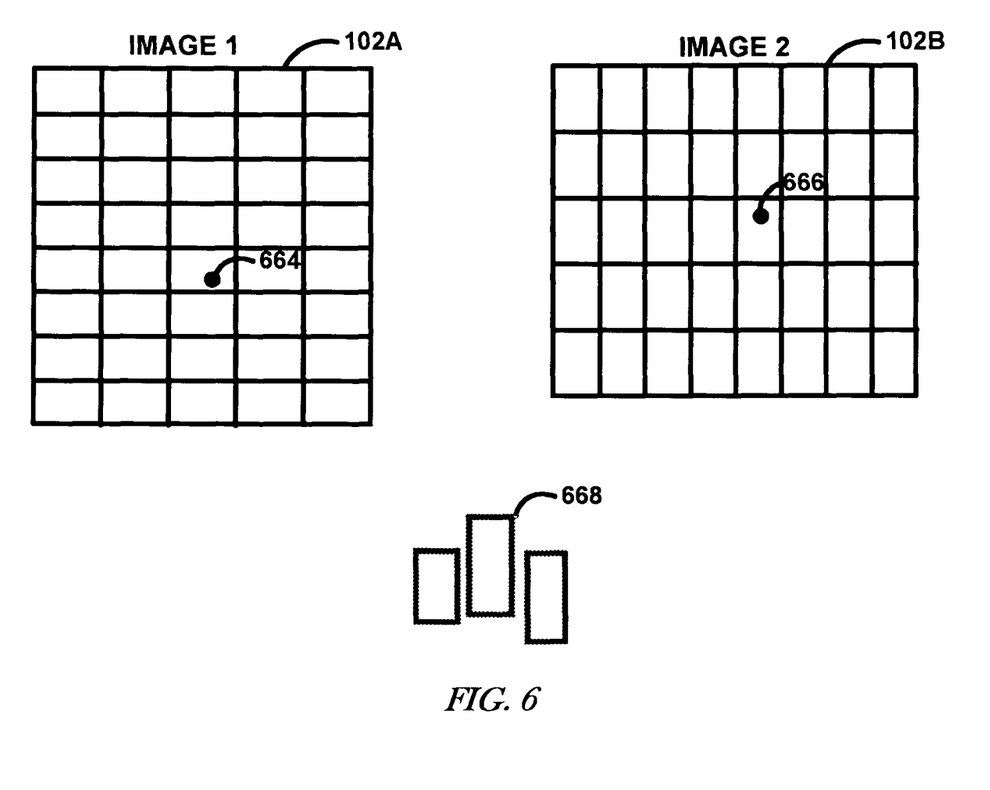
FIG. 6 illustrates, by way of example, a logical diagram of performing the identify candidate 3D evaluation points operation from FIG. 5.
Figure 7:
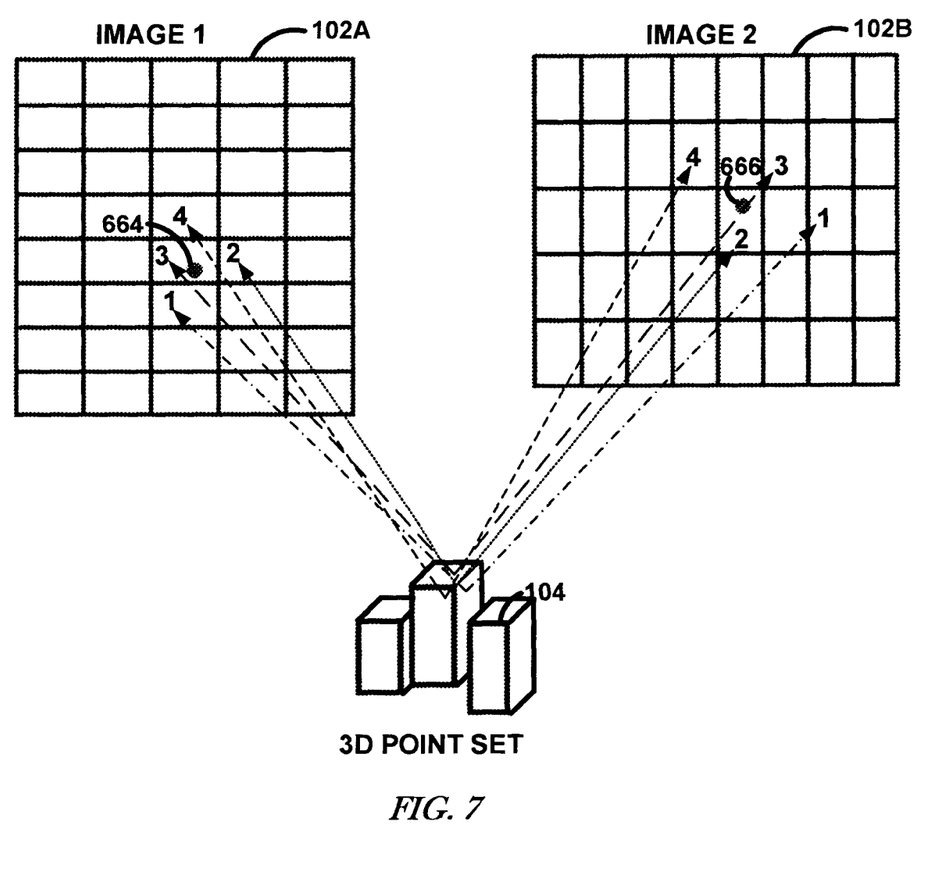
FIG. 7 illustrates, by way of example, a logical diagram of performing the adjudicate 3D evaluation points operation from FIG. 5.

Candidate 3DEPs are identified at operation 556. The operation 556 projects 3D points from the 3D point set 104 into the image space of each of the real images 102. The 3D points that project to within a specified distance (in terms of number of pixels) from the conjugates are retained as candidate 3DEPs. At operation 558, the candidate 3DEPs are adjudicated to determine a single 3D point to be included in the 3DEP 560. Adjudicating the candidate 3DEPs at operation 558 can include determining a metric for each of the candidate 3DEPs determined at operation 556. The metric can be determined based on respective distances between the candidate 3DEPs and the conjugates 550 in each real image of the real images 102. The metric can be determined per 3D point of the candidate 3DEPs. The metric can include a minimum total distance, a minimum average distance, a weighted average distance in normalized versions of the respective images where the differences in each image are scaled by a row and column ground sample distance (GSD) before computing the distance for the given image, or the like, between the 3D points of the candidate 3DEPs and the conjugates 550. FIGS. 6 and 7 illustrate the identifying operation 556 and the adjudicating operation 558 to help explain those operations.

FIG. 6 illustrates, by way of example, a logical diagram of performing the operation 556. FIG. 6 illustrates a first real image 102A of the real images 102 and a second real image 102B of the real images 102. The real images 102A-102B have geographical overlap. More real images can be used and two real images are used just for simplicity, explanatory purposes, and without loss of generality. A conjugate point 664 from the first real image 102A is automatically identified or identified by a user. A conjugate point 666 from the second real image 102B is automatically identified or identified by the same user. The conjugate points 664, 666 are intended to correspond to a same geographical point. Points 668 in the 3D point set 104 (see FIG. 1) that correspond to the same geographical point as the conjugate points are identified automatically (see operation 556 of FIG. 5). In the Example of FIG. 6, the conjugate points 664, 666 correspond to a corner of a building in 2D images 102A, 102B.

Automatic identification of the 3DEP can include projecting one or more points in the 3D point set 104 to the respective image spaces of the images 102A and 102B. Automatic identification can include identifying 3D points (represented as "1", "2", "3", "4" in FIG. 7) closest to the conjugate or conjugates 664, 666. All 3D points within a specified distance of the conjugates (after projection) can be added to a set of candidate 3D points. In some embodiments, all of the 3D points that project to a same pixel as the conjugate 664, 666 can be retained. All 3D points that project to the same pixel as all the conjugates 664, 666 can be retained as candidate 3DEPs.

FIG. 7 illustrates, by way of example, a logical diagram of performing the operation 558. FIG. 7 illustrates the first real image 102A of the real images 102 and the second real image 102B of the real images 102. In FIG. 7, 3D points that project to within a specified distance of the conjugates 664, 666 are identified and are indicated by "1", "2", "3", "4". Each of the candidate 3D points are projected to each of the real images 102A and 102B at the offset indicated by the coarse and fine registrations. Respective distances between each of the 3D points (represented by numbers "1", "2", etc.) and the respective conjugate points 664, 666 can be determined. The distance can be ground distance, pixel distance (row and column distance at a pixel or sub-pixel level), or the like. The distances between a projected 3D point and the conjugate point can be summed across real images 102A-102B. That is, for example, a distance between the projected 3D point "1" and the conjugate point 664 can be added to a distance between the projected 3D point "1" and the conjugate point 666. A similar sum can be determined for each of the rest of the 3D points "2", "3", "4", etc. The 3D point corresponding to the smallest total distance, smallest average distance, or other similar metric, can be used as the 3DEP 560. In the example illustrated in FIG. 7, the search is for the 3D point of the 3D point set 104 that is closest to the corner of the building indicated by the conjugates 664, 666. In the example of FIG. 7, the 3D point "2" corresponds to the smallest total distance and the smallest average distance. Thus, "2" can be used as the 3D point in the 3DEP 560. Also, the 3D point "2" is the one closest to the corner of the building.

Embodiments can identify a 3D point based on conjugates in two or more images. A specific use case of two 2D images can include two stereo images, sometimes called a stereo pair. A high-accuracy stereo pair is a set of images that have been controlled to accurately surveyed ground location. The concept of stereo pair alludes to a large enough convergence angle (i.e. angular separation between the images) so that the user-selected image conjugates can be ray-intersected to obtain a ground truth point. The "automatic" 3DEP locations described herein are the ground coordinates of a point cloud evaluation point. Since the stereo pair has high accuracy, the ray-intersection ground location can be considered the "true" location of a feature. The "auto-determined 3DEPs" are thus evaluation points in the point cloud (which may have significant error). The 3D-difference vector between the ground truth point and the evaluation point characterize the true error in the point cloud at that point. The true error can be compared with the predicted error (predicted error is the associated error covariance of the evaluation point). The predicted error_can be automatically compared with the true error for validation of the predicted error. Automatic determination of many such evaluation points provide a statistical measure of the true error and the associated predicted errors for the entire point cloud.

In summary, each synthetic image tile, used for correlation is centered at the conjugate pixel coordinates that are translated to account for the offset by subtracting the coarse registration offset. The fine registration offset (estimated at a subpixel level) is subtracted from the synthetic image tile center to get the location in the synthetic image corresponding to the image conjugate coordinates. A list of all the 3D points in a neighborhood of the synthetic image location is identified and compute (and save) the row and column difference of each point from the registered location (from which a Euclidean distance is computed).

After all the real images have been processed, there is a set of conjugates and a list of 3D candidate points from each real image along with their differences from the registered conjugate location. The list of points is processed for a common point between all the real images. The 3D location that is chosen is the common point that minimizes the sum of the distances between the conjugate and the projected 3D points at the registered location (computed above) over all the real images.

Figure 8:
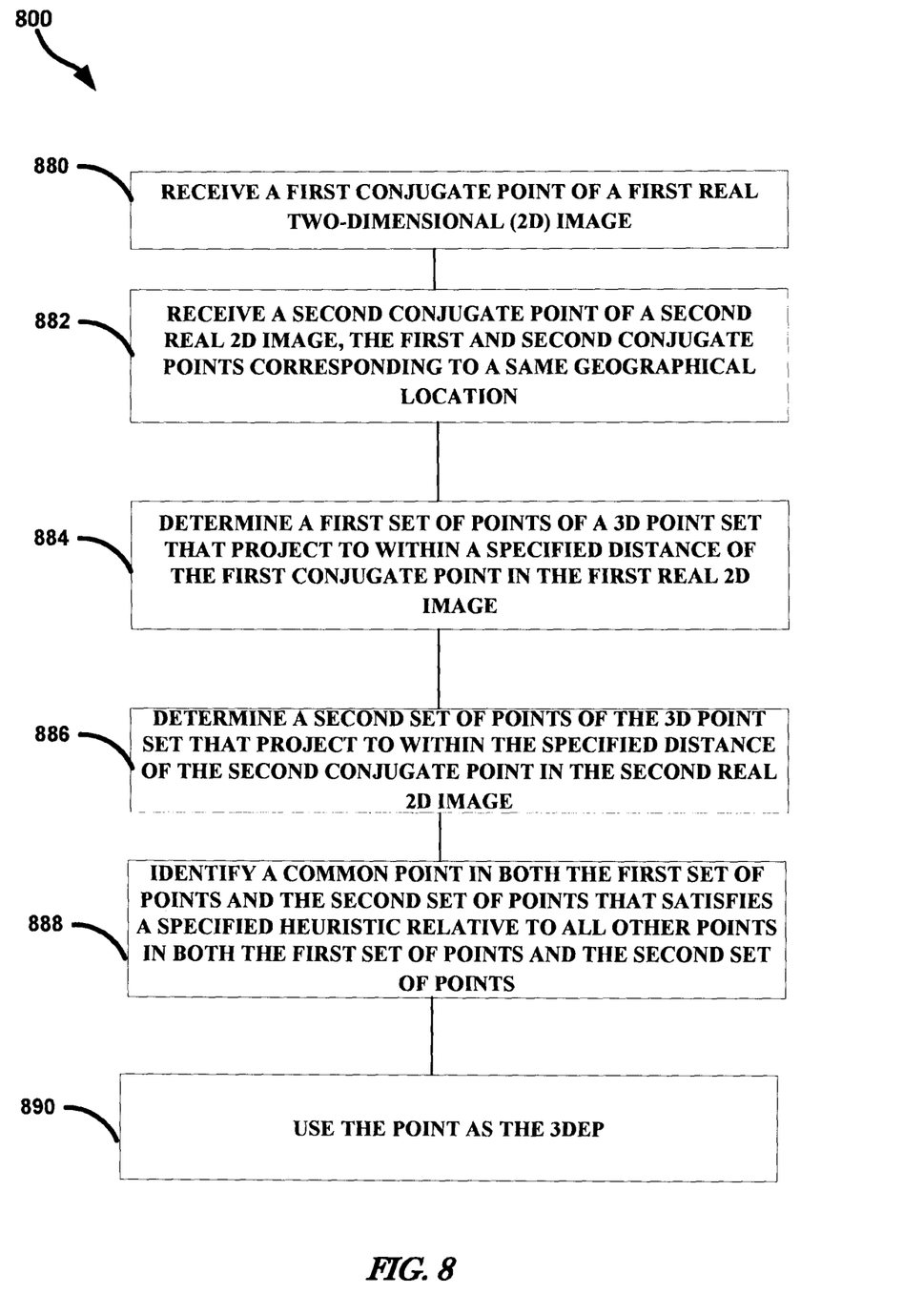
FIG. 8 illustrates, by way of example, a diagram of an embodiment of a method for 3D evaluation point generation.

FIG. 8 illustrates, by way of example, a diagram of an embodiment of a method 800 for 3DEP generation. The method 800 as illustrated includes receiving a first conjugate point of a first real two-dimensional (2D) image, at operation 880; receiving a second conjugate point of a second real 2D image, the first and second conjugate points corresponding to a same geographical location, at operation 882; determining a first set of points of a 3D point set that project to within a specified distance of the first conjugate point in the first real 2D image, at operation 884; determining a second set of points of the 3D point set that project to within the specified distance of the second conjugate point in the second real 2D image, at operation 886; identifying a common point in both the first set of points and the second set of points that satisfies a specified heuristic relative to all other points in both the first set of points and the second set of points, at operation 888; and using the point as the 3DEP, at operation 890. While the description regards two images, conjugates from more than two images can be identified and the techniques can be applied in such situations.

The method 800 can further include determining respective first distances between (i) each point in both the first set of the points and the second set of point and (ii) the first conjugate point. The method 800 can further include determining respective second distances between (i) each point in both the first set of the points and the second set of point and (ii) the second conjugate point. The method 800 can further include combining distances of the respective first distances and the respective second distances that correspond to the same point.

The method 800 can further include, wherein the heuristic is a smallest total distance. The method 800 can further include, wherein the first and second real 2D images are accurate stereo pairs. The method 800 can further include, wherein the first and second conjugate points are user-specified.

Figure 9:
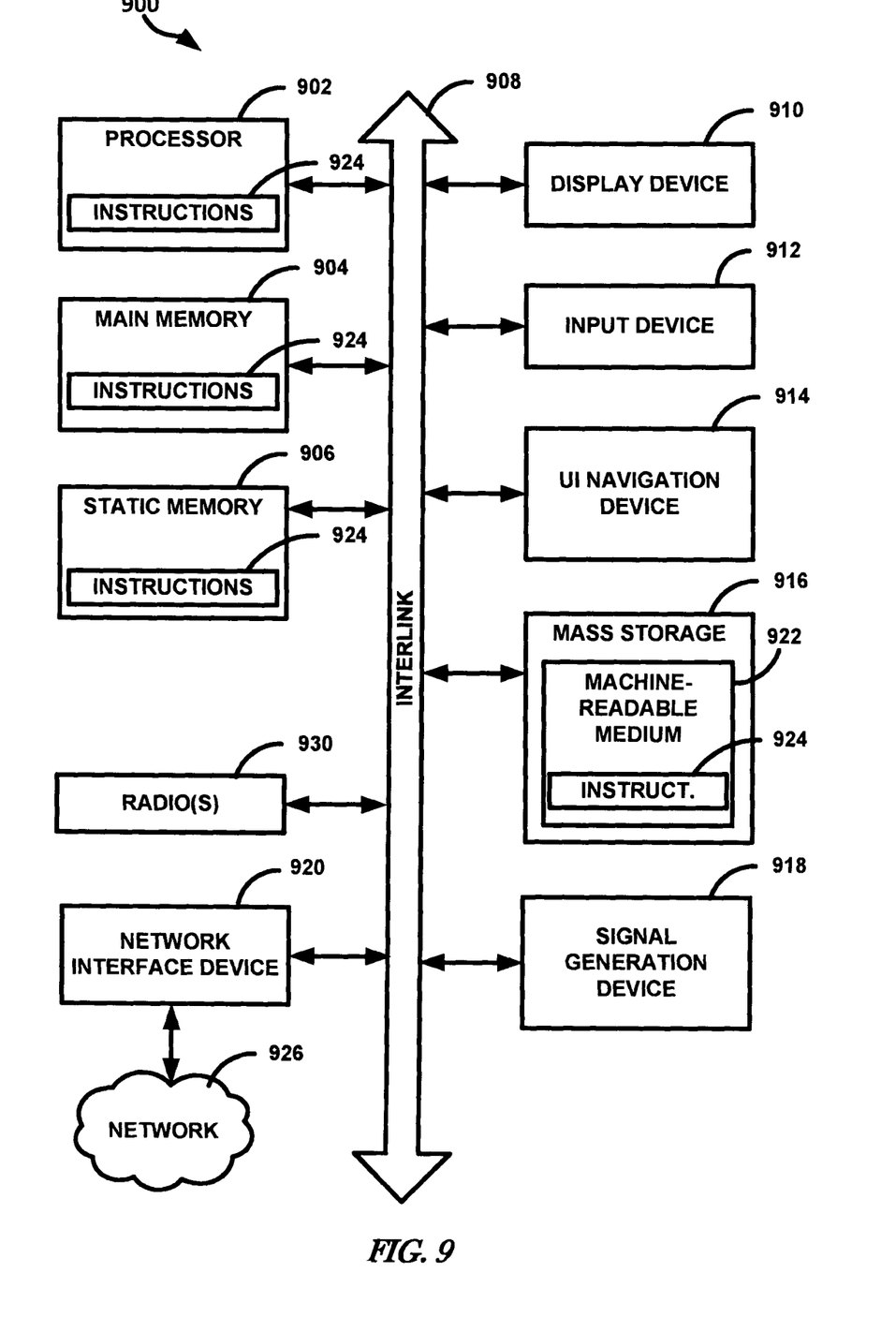
FIG. 9 illustrates, by way of example, a block diagram of an embodiment of a machine in the example form of a computer system 900 within which instructions, for causing the machine to perform any one or more of the methodologies discussed herein, may be executed.

FIG. 9 illustrates, by way of example, a block diagram of an embodiment of a machine in the example form of a computer system 900 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a mass storage unit 916, a signal generation device 918 (e.g., a speaker), a network interface device 920, and a radio 930 such as Bluetooth, WWAN, WLAN, and NFC, permitting the application of security controls on such protocols.

The mass storage unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLE EMBODIMENTS

Example 1 includes a method for three-dimensional (3D) evaluation point (3DEP) identification, the method comprising receiving a first conjugate point of a first real two-dimensional (2D) image, receiving a second conjugate point of a second real 2D image, the first and second conjugate points corresponding to a same geographical location, determining a first set of points of a 3D point set that project to within a specified distance of the first conjugate point in the first real 2D image, determining a second set of points of the 3D point set that project to within the specified distance of the second conjugate point in the second real 2D image, identifying a common point in both the first set of points and the second set of points that satisfies a specified heuristic relative to all other points in both the first set of points and the second set of points, and using the point as the 3DEP.

In Example 2, Example 1 further includes determining respective first distances between (i) each common point in both the first set of the points and the second set of point and (ii) the first conjugate point.

In Example 3, Example 2 further includes determining respective second distances between (i) each common point in both the first set of the points and the second set of point and (ii) the second conjugate point.

In Example 4, Example 3 further includes combining distances of the respective first distances and the respective second distances that correspond to the same point.

In Example 5, Example 4 further includes, wherein the heuristic is a smallest total distance.

In Example 6, at least one of Examples 1-5 further includes, wherein the first and second real 2D images are accurate stereo pairs.

In Example 7, at least one of Examples 1-6 further includes, wherein the first and second conjugate points are user-specified.

Example 8 includes a system for three-dimensional (3D) evaluation point (3DEP) identification, the system comprising a database including a 3D point set of a geographical region stored thereon, and processing circuitry configured to perform the method of at least one of Examples 1-7.

Example 9 includes at least one non-transitory machine-readable medium including instructions that, when executed by a machine, cause the machine to perform operations for three-dimensional (3D) evaluation point (3DEP) identification, the operations comprising the method of one of Examples 1-7.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for three-dimensional (3D) evaluation point (3DEP) identification, the method comprising:
   receiving a first conjugate point of a first real two-dimensional (2D) image;
   receiving a second conjugate point of a second real 2D image, the first and second conjugate points corresponding to a same geographical location;
   determining a first set of points of a 3D point set that project to within a specified distance of the first conjugate point in the first real 2D image;

determining a second set of points of the 3D point set that project to within the specified distance of the second conjugate point in the second real 2D image;

identifying a common point in both the first set of points and the second set of points that satisfies a specified heuristic relative to all other points in both the first set of points and the second set of points by determining respective first distances between (i) each common point in both the first set of points and the second set of points and (ii) the first conjugate point, determining respective second distances between (i) each common point in both the first set of the points and the second set of points and (ii) the second conjugate point, and combining distances of the respective first distances and the respective second distances that correspond to the same point; and using the point as the 3DEP.

2. The method of claim 1, wherein the heuristic is a smallest total distance.

3. The method of claim 1, wherein the first and second real 2D images are accurate stereo pairs.

4. The method of claim 1, wherein the first and second conjugate points are user-specified.

5. A system for three-dimensional (3D) evaluation point (3DEP) identification, the system comprising:
a database including a 3D point set of a geographical region stored thereon;
processing circuitry configured to:
receive a first conjugate point of a first real two-dimensional (2D) image;
receive a second conjugate point of a second real 2D image, the first and second conjugate points corresponding to a same geographical location;
determine a first set of points of the 3D point set that project to within a specified distance of the first conjugate point in the first real 2D image;
determine a second set of points of the 3D point set that project to within the specified distance of the second conjugate point in the second real 2D image;
identify a common point in both the first set of points and the second set of points that satisfies a specified heuristic relative to all other points in both the first set of points and the second set of points by determining respective first distances between (i) each common point in both the first set of points and the second set of points and (ii) the first conjugate point, determining respective second distances between (i) each common point in both the first set of the points and the second set of points and (ii) the second conjugate point, and combining distances of the respective first distances and the respective second distances that correspond to the same point; and use the point as the 3DEP.

6. The system of claim 5, wherein the heuristic is a smallest total distance.

7. The system of claim 5, wherein the first and second real 2D images are accurate stereo pairs.

8. The system of claim 5, wherein the first and second conjugate points are user-specified.

9. At least one non-transitory machine-readable medium including instructions that, when executed by a machine, cause the machine to perform operations for three-dimensional (3D) evaluation point (3DEP) identification, the operations comprising:
receiving a first conjugate point of a first real two-dimensional (2D) image;
receiving a second conjugate point of a second real 2D image, the first and second conjugate points corresponding to a same geographical location;
determining a first set of points of a 3D point set that project to within a specified distance of the first conjugate point in the first real 2D image;
determining a second set of points of the 3D point set that project to within the specified distance of the second conjugate point in the second real 2D image;
identifying a common point in both the first set of points and the second set of points that satisfies a specified heuristic relative to all other points in both the first set of points and the second set of points by determining respective first distances between (i) each common point in both the first set of points and the second set of points and (ii) the first conjugate point, determining respective second distances between (i) each common point in both the first set of the points and the second set of points and (ii) the second conjugate point, and combining distances of the respective first distances and the respective second distances that correspond to the same point; and using the point as the 3DEP.

10. The non-transitory machine-readable medium of claim 9, wherein the heuristic is a smallest total distance.

11. The non-transitory machine-readable medium of claim 9, wherein the first and second real 2D images are accurate stereo pairs.

* * * * *